Patented Apr. 14, 1936

2,037,654

UNITED STATES PATENT OFFICE 2,037,654

PROCESS FOR THE PREPARATION OF ORGANIC ACIDS FROM KETONES

Alfred T. Larson, Wilmington, Del., assignor to E. I. du Pont de Nemours & Company, Wilmington, Del., a corporation of Delaware No Drawing. Application May 25, 1933, Serial No. 672,809

10 Claims. (Cl. 260—112)

This invention relates to a process for the preparation of organic carboxylic acids and more particularly to the preparation of trimethyl acetic acid from acetone, carbon monoxide, and steam.

An object of the present invention is to provide a process for the interaction of ketones, carbon monoxide, and steam for the preparation of organic carboxylic acids. Another object of the invention is to provide a process for the interaction of acetone, carbon monoxide, and steam for the production of trimethyl acetic acid and acetic acid. A further object of the invention is to provide catalysts and optimum operating conditions for carrying out these reactions. Other objects and advantages will hereinafter appear.

I have found that organic carboxylic acids can be produced by the reaction of steam, carbon monoxide, and ketones, that is a symmetrical or unsymmetrical ketone, for example, acetone, methylethyl ketone, diethyl ketone, methyl propyl ketone, ethyl propyl ketone, etc. The acid-forming reaction of the ketones with steam and carbon monoxide apparently proceeds in accordance with the equation:

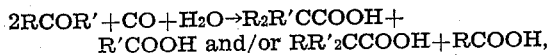

the R and R' groups being similar or dissimilar alkyl, aryl, or aralkyl substituents. When ketones having dissimilar alkyl groups are reacted, whether one of the above indicated products will predominate or a mixture of the two will obtain is governed, inter alia, by the relative reactivity of the alkyl groups in the ketone. Acetone, for example, reacts with steam and carbon monoxide to form, from 2 mols of the ketone, 1 mol of trimethy acetic acid and 1 mol of acetic acid:

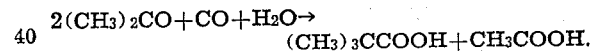

The higher symmetrical ketones as well as the unsymmetrical ketones give analogous reaction products.

The carbon monoxide required for the synthesis may be conveniently derived from various commercial sources, such as, for example, water-gas, producer gas, etc., by liquefaction and by other means, and should likewise for the best results be relatively pure. It seems particularly desirable to avoid the presence of sulfur compounds and iron carbonyls.

Inert gases, such as nitrogen, methane, and carbon dioxide, may be included with the reactants, this being advantageous in some cases from the standpoint of controlling the temperature of the exothermic reaction and of limiting the extent thereof, where it may be desired to restrict the overall conversion of the reaction for the sake of enhancing the relative yield of the desired acid. When employing one or more of the above gases as inert carriers to effect the invention, it or they should generally be present in amount constituting approximately 40% or more by volume of the whole gaseous mixture, including the steam.

The relative proportions of the reactants can be varied thru relatively wide limits but for economical reasons it is usually best to operate with the carbon monoxide in excess, and with concentrations of the ketones within the range of from 1½ to 10% by volume of the total reactants. Within this range of concentrations particularly good results have been obtained with pressures in the neighborhood of 500 atmospheres. Higher concentrations of the ketones may be used if desired.

The use of pressures in excess of atmospheric, say from 25–900 atmospheres, is preferred. The reaction proceeds over a wide range of temperatures while working under these pressures, although the optimum temperature varies in specific cases, depending inter alia upon the ketones being used. Generally the desired reaction can be obtained at from 200–500° C. From the standpoint of practical operation the temperature should not be so low that the reaction is uneconomical, nor so high as to result in undesirable by-products by decomposition and/or polymerization of raw materials. From this point of view this process has been found to operate satisfactorily within the range of 275–375° C.

The following examples will illustrate methods of practicing the invention, although the invention is not limited to the examples:

*Example 1.*—An inert gas mixture consisting of 76.5% carbon monoxide, 3.8% acetone, 19.2% steam, and 0.5% hydrochloric acid, is passed into a catalytic reaction chamber in which activated charcoal was disposed. A temperature between 250–300° C., a pressure of 700 atmospheres and a space velocity of approximately 6000 were maintained, during the reaction. The converted gases were condensed and a condensate obtained containing approximately 1 mol per liter of trimethyl acetic acid, 2 mols per liter of acetic acid, and a small amount of formic acid.

*Example 2.*—A gas mixture containing by volume 70 parts of carbon monoxide, 5 parts of methylethylketone, 25 parts of steam, is passed at a temperature of 25° C. and a pressure of 700 atmospheres together with 0.5 parts of hydrogen chloride over an activated charcoal catalyst disposed in a suitable catalytic reaction chamber. The condensate obtained upon cooling the converted gases contains a mixture of normal and iso-organic acids, the alkyl groups in the latter being predominantly dissimilar.

Other catalysts may be employed in the process and include generally the inorganic acids, for example the acids of phosphorus, arsenic, and boron, which catalysts may be present in the activated charcoal used or supported upon them or any other type of suitable catalyst support. These catalysts may be used with or without the presence of a volatile halide such as is used in the processes described in the examples. Activated charcoal alone is a good catalyst for the reaction, but generally I prefer to employ it in conjunction with an inorganic acid, which may be either of a volatile or a non-volatile character. The following catalysts may likewise be employed: calcium chloride, boron fluoride, cadmium phosphate, silico-tungstic acid, zinc chloride, calcium chloride, calcium iodide, calcium bromide, potassium fluoride, etc. When employing the volatile halides in conjunction with a solid catalyst, such as activated carbon, impregnated or not with another catalyst, I have found that the volatile halides, such, for example, as hydrogen chloride and ammonium chloride, are particularly useful, and, in some instances, the halogens themselves are sufficiently active in conjunction with active carbon to catalyze the reaction. Generally speaking, catalysts adapted for the preparation of acids from alcohols and carbon monoxide are suitable for catalyzing the reaction when conducted in accord with my invention.

The apparatus which may be employed for conducting these reactions may be of any conventional type and preferably one in which the temperature of the reaction can be readily controlled at the desired value. Owing to the corrosive action of the acids produced the interior of the converter and conduits leading therefrom are preferably protected. This may be accomplished by using glass or glass-lined apparatus or by coating the inner surfaces of the apparatus with chromium or silver, or using for the construction of this equipment acid-resisting alloys of, for example, molybdenum, cobalt, tungsten, chromium, manganese, or nickel.

From a consideration of the above specification it will be realized that any process involving the interaction of ketones, carbon monoxide and steam and more particularly the preparation of trimethyl acetic acid from acetone, carbon monoxide and steam will come within the scope of this invention without sacrificing any of the advantages that may be derived therefrom.

I claim:

1. The process of producing trimethyl acetic acid and acetic acid which comprises reacting acetone, steam, and carbon monoxide.

2. A process for the preparation of trimethyl acetic acid and acetic acid from acetone, carbon monoxide, and steam which comprises interacting a gaseous mixture comprising approximately 1½ to 10% acetone with a gaseous mixture containing carbon monoxide, and steam, in the presence of an activated charcoal catalyst and hydrogen chloride.

3. A process of producing organic carboxylic acids which comprises reacting a lower aliphatic ketone, steam, and carbon monoxide substantially in accord with the equation:

$$2RCOR' + H_2O + CO \rightarrow R_2R'CCOOH + R'COOH$$

in which R and R' represent similar or dissimilar alkyl radicals.

4. The process of producing an organic acid which comprises reacting a lower aliphatic ketone, steam and carbon monoxide.

5. A process of reacting a lower aliphatic ketone, steam, and carbon monoxide and thereby producing an organic acid the process being characterized in that an excess of steam and carbon monoxide is employed with relation to the ketone.

6. A process of reacting a lower aliphatic ketone, steam, and carbon monoxide and thereby producing an organic acid, the process being characterized in the reaction is effected under a pressure within the range of from 25–900 atmospheres.

7. The process of producing an organic acid which comprises reacting a lower aliphatic ketone, steam and carbon monoxide in the presence of a catalyst adapted for the synthesis of acetic acid from methanol and carbon monoxide.

8. The process of producing an organic acid which comprises reacting a lower aliphatic ketone, steam and carbon monoxide in the presence of an activated charcoal catalyst and hydrogen chloride.

9. The process of producing an organic acid which comprises reacting a lower aliphatic ketone, steam and carbon monoxide in the presence of a catalyst adapted for the synthesis of acetic acid from methanol and carbon monoxide, the process being characterized in that the reaction is effected at a temperature within the range of 200–500° C.

10. The process of producing an organic acid which comprises reacting a lower aliphatic ketone, steam and carbon monoxide in the presence of a catalyst adapted for the synthesis of acetic acid from methanol and carbon monoxide, the process being characterized in that the reaction is effected at a temperature within the range of 200–500° C. and under a pressure within the range of from 25–900 atmospheres.

ALFRED T. LARSON.